United States Patent [19]
Fulbert et al.

[11] Patent Number: 5,832,010
[45] Date of Patent: Nov. 3, 1998

[54] SWITCHED MONOLITHIC MICROLASER AND INTRACAVITY NONLINEAR MATERIAL

[75] Inventors: Laurent Fulbert, Voiron; Engin Molva, Grenoble, both of France

[73] Assignee: Commissariat a l'Energie Atomique, Paris, France

[21] Appl. No.: 635,388

[22] Filed: Apr. 19, 1996

[30] Foreign Application Priority Data

May 12, 1995 [FR] France ................................. 95 5650

[51] Int. Cl.[6] ................................................ H01S 3/10
[52] U.S. Cl. .................... 372/22; 372/53; 372/37; 372/12; 372/92
[58] Field of Search ........................ 372/22, 98, 99, 372/92, 11, 10, 37, 12, 53

[56] References Cited

U.S. PATENT DOCUMENTS

| | | |
|---|---|---|
| 4,191,931 | 3/1980 | Kuppenheimer . |
| 4,953,166 | 8/1990 | Mooradian ................. 372/21 |
| 4,982,405 | 1/1991 | Zayhowski et al. . |
| 5,048,051 | 9/1991 | Zayhowski . |
| 5,256,116 | 10/1993 | Moorqdian ................. 372/92 |
| 5,256,164 | 10/1993 | Mooradian ................. 372/99 |
| 5,295,146 | 3/1994 | Gavrilovic et al. ......... 372/22 |
| 5,365,539 | 11/1994 | Mooradian ................. 372/92 |
| 5,381,431 | 1/1995 | Zayhowski ................. 372/99 |
| 5,388,114 | 2/1995 | Zarrabi et al. . |
| 5,394,413 | 2/1995 | Zayhowski . |
| 5,402,437 | 3/1995 | Mooradian ................. 372/22 |
| 5,430,754 | 7/1995 | Suzuki et al. ............... 372/22 |
| 5,488,619 | 1/1996 | Injeyan et al. .............. 372/11 |
| 5,495,494 | 2/1996 | Molva et al. ............... 372/98 |
| 5,559,823 | 9/1996 | Valette ....................... 372/92 |
| 5,902,737 | 3/1996 | Chartier et al. ............ 372/11 |

FOREIGN PATENT DOCUMENTS

| | | |
|---|---|---|
| 0 523 861 | 1/1993 | European Pat. Off. . |
| 0 596 714 | 5/1994 | European Pat. Off. . |
| 1 566 716 | 5/1980 | United Kingdom . |

OTHER PUBLICATIONS

Proceedings of The Conference on Lasers and Electro Optics, vol. 12, pp. 282–283, May 1992, A. Eda, et al., "Microchip Lasers Fabricated by a Novel Photolithography Technique".

Optics Letters, vol. 10, No. 5, pp. 232–234, May 1985, C.S. Lee, et al., "Observation of Optical Bistability Due to Resonator Configuration Transition".

Optics Letters, vol. 17, No. 17, pp. 1201–1203, 1992, J.J. Zayhowski, et al., "Diode–Pumped Microchip Lasers Electro–Optically Q Switched at High Pulse Repetition Rates" No Month.

Optics Communications, vol. 10, No. 1, pp. 18–20, Jan. 1974, K.H. Drexhage, et al., "New Dye Solutions for Mode–Locking Infrared Lasers".

Mol. Cryst. Liq. Cryst., vol. 183, pp. 291–302, 1990, U.T. Mueller–Westerhoff, et al., "Near–Ir Dies for the 1.3 to 1.5 Micron Region: The Use of Substituted Dithiolene Complexes" No Month.

Optics Communications, vol. 105, No. 3.4, pp. 183–187, 1994, N. Mackinnon, et al., "A Laser Diode Array Pumped, ND:YVO$_4$/KTP, Composite Material Microchip Laser" No Month.

*Primary Examiner*—Leon Scott, Jr.
*Attorney, Agent, or Firm*—Oblon, Spivak, McClelland, Maier & Neustadt, P.C.

[57] ABSTRACT

A microlaser cavity to a microlaser incorporating an active solid medium (38) and means (44) for switching the cavity, whilst also having, within said cavity, at least one element (46) of an optically nonlinear material, making it possible to multiply the basic frequency of the laser cavity by a factor n ($n \geq 2$).

16 Claims, 7 Drawing Sheets

SWITCHED MONOLITHIC MICROLASER AND INTRACAVITY NONLINEAR MATERIAL

BACKGROUND OF THE INVENTION

1. Field of the Invention

The invention relates to the field of switched solid microlasers.

The main advantage of the microlaser is its multilayer stack structure, which constitutes its essential characteristic. The active laser medium is constituted by a material of limited thickness between 150 and 1000 μm and of small dimensions (a few $mm^2$) on which are directly deposited dielectric cavity mirrors. This active medium can be pumped by a III-V laser diode, which is either directly hybridized on the microlaser, or coupled to the latter by an optical fibre. The possibility of mass production using micro-electronic means enables said microlasers to be produced at a very limited cost.

Microlasers have numerous applications in fields as varied as cars, the environment, scientific instrumentation and telemetry.

2. Discussion of Background

Figure 1:
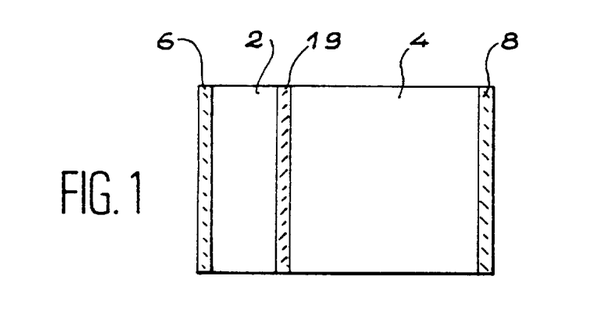
FIG. 1 A microlaser continuously emitting with a frequency doubler according to the prior art.

A continuously emitting, frequency duplicated or doubled microlaser has already been produced and is described in the article by N. MacKinnon et al entitled "A laser diode array pumped, $Nd:YVO_4/KTP$, composite material micro-chip laser", published in Optics Communications, vol. 105, pp 183–187, 1994. The microlaser described (FIG. 1) is formed by a $YVO_4:Nd$ crystal 2 of thickness 0.5 mm to which is connected a 2 mm thick KTP crystal 4. The mirrors 6 and 8 of the cavity have a high reflection at 1.064 μm on the input and output faces and high transmission at 532 nm. The device is optically pumped by a laser diode at approximately 800 nm. As the two mirrors have a reflectivity of approximately 99.8% at 1.64 μm, the power flowing within the cavity at 1.064 μm is high (between a few watts and a few dozen watts). The radiation at 1.064 μm is converted into radiation at 532 nm by the nonlinear KTP crystal. The conversion efficiency between the pumping diode at 808 nm and the radiation at 532 nm is approximately 4%.

The microlaser device described in this document has the following problems. Firstly the conversion efficiency is low due to the low power flowing within the microlaser cavity. The high reflection mirrors at 1.064 μm must be of excellent quality to obtain a microlaser cavity having a high overvoltage coefficient Q. Such mirrors are difficult to produce and are expensive, which is incompatible with the possibility of mass production of microlasers. Moreover, the microlaser obtained is monolithic, but is produced by a manual process involving adhesion or bonding stages of precut fragments. This process is incompatible with the need for the mass production at low cost of microlasers.

SUMMARY OF THE INVENTION

The invention proposes a microlaser cavity, whose beam is frequency multiplied (doubled, tripled, etc.), the efficiency of the doubling, tripling and similar operation being high. Moreover, the microlaser cavity structure must be compatible with mass production processes utilizing microelectronics means. Finally, the structure obtained must be monolithic.

More specifically, the invention relates to a microlaser cavity incorporating an active solid medium and means for switching the cavity, characterized in that at least one element of an optically nonlinear material making it possible to multiply the basic frequency of the microlaser cavity by an integer n (n>2) is incorporated in the interior of the cavity.

In switched operation, the microlaser emits high peak power, low time width pulses. The power of the intracavity laser radiation then reaches very high values exceeding by several orders of magnitude the intracavity power obtained in continuous operation. The efficiency of conversion of the laser frequency into double or triple frequency in the optically nonlinear material is consequently very good, because said efficiency is dependent on the laser power. Thus, it is possible to obtain freedom from the presence of input and output mirrors of the cavity having an extremely high reflection coefficient at the basic frequency of the microlaser cavity. It is pointed out that reflectivities of approximately 99.9% are necessary for a correct continuous operation, whereas lower reflectivities are adequate in "switched" operation.

According to an embodiment of the invention, the microlaser cavity is passively switched by a saturable absorber.

Another aspect of the invention relates to the relative arrangement of the saturable absorber and the active medium within the microlaser cavity.

In general terms, in known lasers passively switched with the aid of a saturable absorber, the following arrangements have been proposed for the interior of the laser cavity.

Figure 2A:
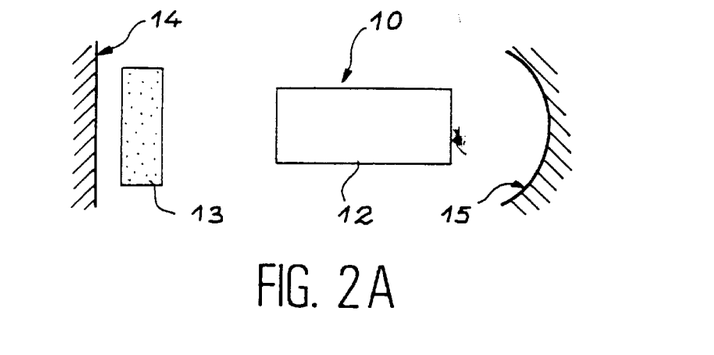
FIGS. 2A to 2E, already described, diagrammatically various possible arrangements of a laser cavity with saturable absorber according to the prior art.

1. A first arrangement is illustrated in FIG. 2A, where reference 10 designates a laser cavity and references 12, 13, 14, 15 respectively the active laser material, the saturable absorber and the cavity input and output mirrors. There is no contact between the saturable absorber 13 and the other elements of the cavity 10.

In such a device, it is necessary to optically align the cavity elements. Moreover, optical settings may be necessary during the use of the laser.

Figure 2B:
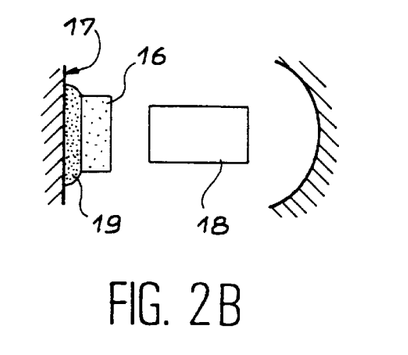
Figure 2C:
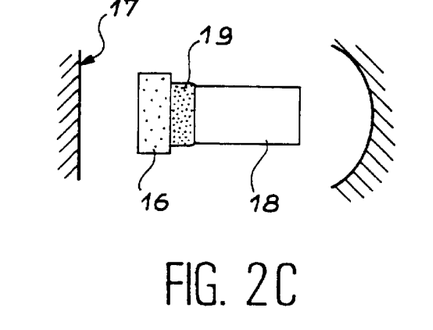

2. In the arrangements illustrated in FIGS. 2B and 2C, a contact is ensured between the saturable absorber 16 and a mirror 17 (FIG. 2B) or the active laser material 18 (FIG. 2C) with the aid of an optical adhesive 19.

However, the adhesive introduces a residual absorption factor, as well as index differences at the adhesive-adhered material interface. Moreover, a possible parallelism defect between the adhered elements can also be the source of losses in the laser cavity.

Figure 2D:
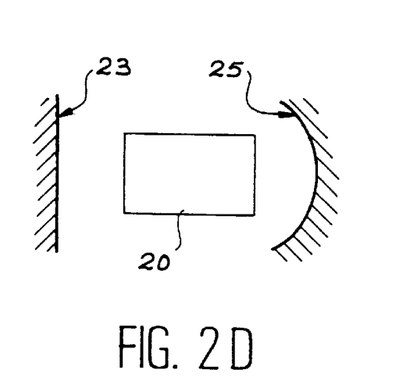
Figure 2E:
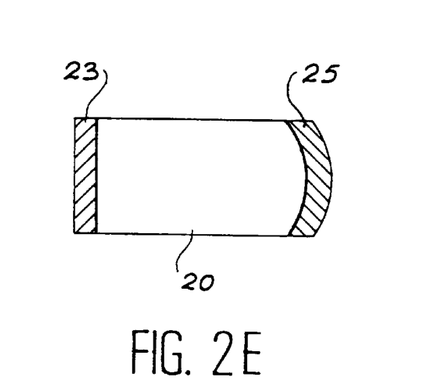

3. FIGS. 3D and 2E illustrate a third possible arrangement. References 23 and 25 designate the laser cavity input and output mirrors. Reference 20 represents the active laser material, but the latter is codoped with active laser ions and saturable absorber ions. The same medium then serves as the active medium and the saturable absorber medium. It is therefore impossible to independently regulate the properties of the laser material and the saturable absorber.

However, the thickness of the medium influences both the absorption of the saturable absorber and the absorption of the active laser ions, as well as influencing the laser mode structure. The absorption coefficients of the active laser ions and saturable absorbers are directly linked with the concentration of said ions, which are definitively fixed during the growth of the crystals and cannot subsequently be modified. Therefore, for each laser configuration a new crystal must be made. Finally, in the case of passive switching lasers where the same ion (e.g. Er) is used both for the laser action and as the saturable absorber, it is possible to use this codoping method. Thus, the same ion could serve as the active ion or the saturable absorber ion, provided that the concentrations are very different. For the saturable absorber, the concentration must be much higher than for the active laser material.

To obviate the above problems, according to an embodiment the invention proposes depositing the saturable absorber in the form of a thin film directly on the microlaser cavity active material.

One of the main advantages of the invention in this embodiment is the structure of the microlaser cavity (or laser microsystem consisting of a microlaser associated with microoptics) in switched form, which then consists of a stack of films, making it possible to retain the possibility of low cost mass production. This multilayer structure does not cast into doubt the simplicity and mass production processes at low cost of microlasers, such as have been developed for continuous microlasers. It makes it possible to produce fool-proof, self-aligned (no optical setting), monolithic, passively switched microlasers. This structure requires no bonding operation and no complex alignment operation.

Another advantage of the microlaser compared with the "codoped" laser is that the active medium is separated from the saturable absorber, but the bonding or adhesion of the two media is avoided, whilst maintaining a monolithic structure. Thus, it is possible to independently regulate the thicknesses (during the deposition of the films or by mechanical thinning after film deposition) and the concentrations of the ions in the two media and, as a result of said separation, obtain switched lasers where the same ion, (e.g. Er) can be used as the active ion and as the saturable absorber with different concentrations.

According to another aspect of the invention, the film can be formed by an organic dye dissolved in a polymer solvent. According to a variant, the film can be deposited by liquid phase epitaxy.

The microlaser cavity can also be actively switched.

In the field of microlasers, an active switching method is described in the article by J. J. Zayhowski et al entitled "Diode-pumped microchip lasers electro-optically Q-switched at high pulse repetition rates" published in Optics Letters, vol. 17, No. 17, pp 1201–1203, 1992.

Figure 3:
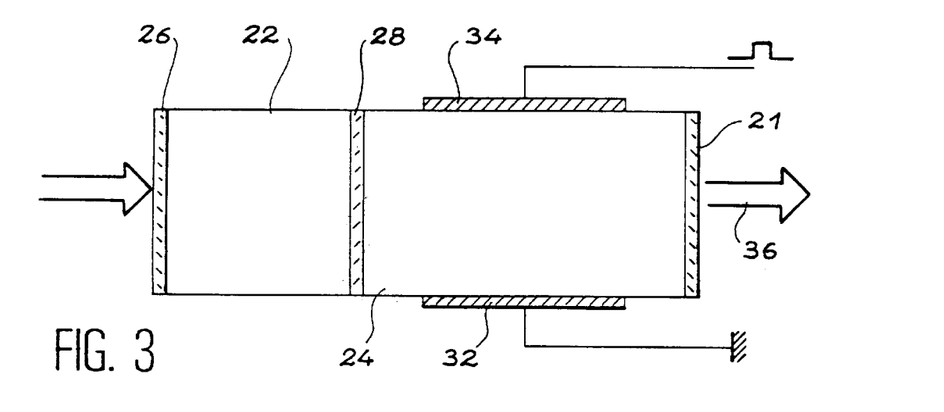
FIG. 3 already described, diagrammatically an actively switched microlaser according to the prior art.

In this document, switching is carried out in a configuration of two coupled Fabry-Perot cavities. Such an assembly is illustrated in FIG. 3, where reference 22 designates the active laser medium and 24 an electrooptical switching material ($LiTaO_3$). The active laser medium 22 of length $L_1$ forms, with an input mirror 26 and an intermediate mirror 28, a first Fabry-Perot cavity. The switching material of length $L_2$ forms with the intermediate mirror 28 and the output mirror 21 a second Fabry-Perot cavity. Switching takes place by modifying the optical length of the switching material 24 by an external action. Switching electrodes 32, 34 are placed perpendicularly to the axis of the laser beam 36 on either side of the material 24. If a voltage V is applied between these electrodes, an electric field E=V/e, in which e is the distance between the electrodes (which corresponds to the thickness of the electrooptical material) results therefrom. The optical index $n_2$ and consequently the optical length $n_2L_2$ of the electrooptical material is modified by the action of the field E. This affects the coupling of the cavities and modifies the reflectivity of the intermediate mirror 28 seen by the laser medium.

Figure 4:
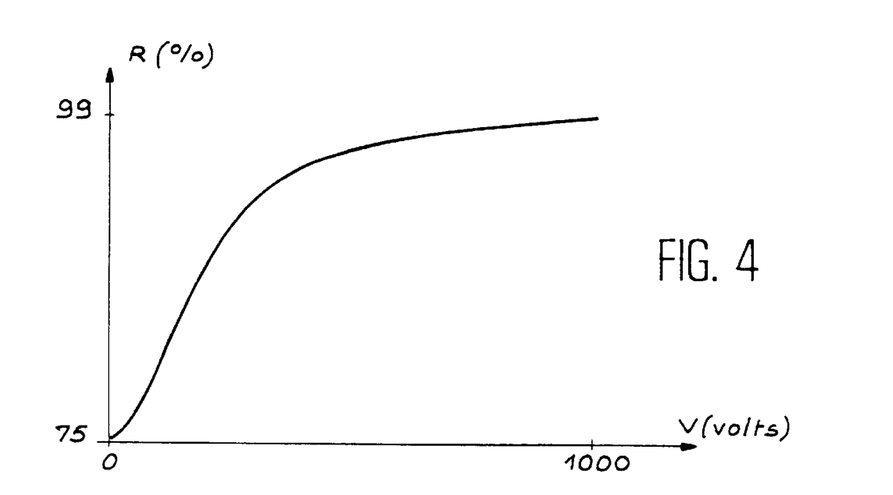
FIG. 4 The reflectivity of the second cavity seen by the active laser medium of the first cavity in a prior art, actively switched microlaser.

For a YAG:Nd microlaser emitting at 1.06 μm and switching material constituted by approximately 1 mm thick $LiTaO_3$ we typically obtain : $1_1$=1.8, $n_2$=2, $L_1$=500 μm, $L_2$=900 μm. The maximum reflectivity variation of the second cavity is obtained for approximately $d\lambda/\lambda = dL_2/L_2 = dn_2/n_2 = 10^{-4}$. This index variation is obtained by applying an electric field of approximately $10^4$ V/cm in the switching material. It is possible to liken the second cavity (electrooptical) to an output mirror of the first cavity constituted by the laser material. The reflectivity of the output mirror is variable and controlled by the external control voltage applied to the electrodes 32, 34. FIG. 4 shows the variation of the reflectivity R of the second cavity as a function of the voltage V applied. For the case where the three mirrors 26, 28, 21 have reflectivities respectively equal to 99, 95 and 50%, the reflectivity of the second cavity will vary between 75 and 99%. Thus, for the active medium this amounts to varying the reflectivity of the output mirror between 75 and 99% by an external voltage control. Thus, the graph of FIG. 4 shows that it is necessary to apply several hundred volts to obtain a reflectivity close to 90% and approximately 1000 V must be applied to obtain a reflectivity of about 99% for an interelectrode distance of 1 mm. Such microlasers cause problems.

Firstly the microlaser is manufactured by a manual process (using the bonding of precut fragments). This imposes a lower limit for the geometrical dimensions, which are at a minimum around 1 mm, and in particular for the distance between the two electrodes. Another problem is the need to reach an adequate field E for the switching. It is thus necessary to apply a voltage of about 1000 V between the two electrodes in a very short time of less than 1 nanosecond and on laser chips with a volume of about 1 $mm^3$. This is very difficult to implement in practice and requires sophisticated electronics not compatible with the simplicity and low production costs of the microlaser.

In order to solve this problem and according to an embodiment of the invention, the active laser medium forms a first resonant cavity between an input mirror and an intermediate mirror, a second material forms a second resonant cavity between the intermediate mirror and the output mirror, the optical index of said material being modulatable by an external disturbance, and laser beam size reduction means are placed at the input of the first resonant cavity, the assembly of the two cavities and the laser beam reduction means being monolithic.

Thus, according to this embodiment, the invention also solves the problem of the high voltage to be applied between the electrodes, whilst making it possible to reduce the microlaser cavity threshold. Thus, with this structure, it is possible to bring the thickness of the second material to about 100 μm. In the case of an electrooptical material this makes it possible to limit the voltage necessary to a value between 50 and 100 V. The microlaser switching threshold is also reduced to approximately a few milliwatts. Finally, this structure is compatible with mass production processes, which make it possible to manufacture small samples and to respect the production costs.

The laser beam size reduction means can be constituted by a concave mirror implemented with a micromirror on the face of the active laser medium to be traversed by the pumping beam. The output mirror can be a concave mirror produced with a micromirror on the output face of the second material. The two cavities can be produced so as to be optically stable.

According to a variant making it possible to obtain a microlaser functioning in the active mode and having an even more simple structure, the invention also relates to a microlaser cavity, which is also at the optical stability limit, and means are provided for varying the optical length of the cavity so as to pass it from an optically unsable state to an optically stable state.

Thus, a new active switching is implemented, because the optically unstable state is a high cavity loss state, unlike the optically stable state.

Moreover, the structure obtained is radically different from the structure known e.g. from the article of J. J. Zayhowski (cf. hereinbefore), because there is only a single Fabry-Perot cavity.

The cavity can be a concentric or spherical, confocal or hemispherical cavity. In this case the size of the beam in the cavity is smaller and it is then possible to reduce the thickness of the materials used. Therefore the microlaser size is further reduced. This has the consequence of making it possible to solve one of the aforementioned problems, namely that of the high voltage value to be applied if the second material is an electrooptical material. Thus, the thickness of the latter decreases, so that the same electrical field is obtained for a lower voltage ($\vec{E}=\Delta V/e$, in which e is the thickness between the electrodes).

According to an embodiment, the cavity has a third material of variable optical length. However, this still only requires a single Fabry-Perot cavity and not two as in the prior art. This leads to a very compact, monolithic structure.

The means for varying the optical length of the cavity can comprise means for varying the length of the third material.

According to another embodiment, the active laser medium and the third material have different optical indexes and the means for varying the optical length of the cavity incorporates means for varying the optical index of the second material. The second material can be an electrooptical material.

Thus, a single microlaser cavity is produced, whose optical length is modified to displace the cavity from the high loss, unstable range to the low loss, stable range, which permits the switching thereof. It is only necessary to have a single Fabry-Perot cavity, even if it contains several materials, one of which is the active laser material, the second being the material from which the element permitting the multiplication of the frequency is formed and the third is an optically variable length material.

When the materials are juxtaposed or bonded or they adhere to one another by molecular adhesion, the compactness of the system is improved, which is very important in the case of a microlaser.

Finally, the invention also relates to a microlaser incorporating a microlaser cavity as described hereinbefore and optical means for pumping the cavity.

BRIEF DESCRIPTION OF THE DRAWINGS

The invention is described in greater detail hereinafter relative to non-limitative embodiments and with reference to the attached drawings, wherein show.

DETAILED DESCRIPTION OF EMBODIMENTS

Figure 5:
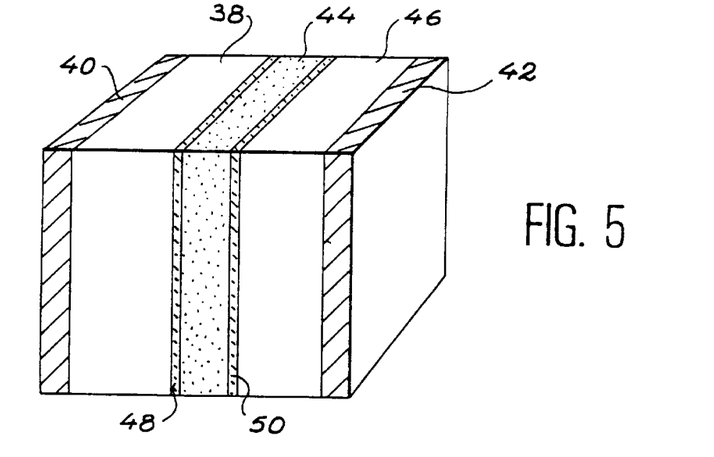
FIG. 5 An embodiment of the invention.

Thus, the invention relates to a microlaser cavity and a microlaser having said cavity, the latter being essentially constituted by an active laser medium 38 and is closed by an input mirror 40 and an output mirror 42 (FIG. 5). Within the cavity are also two other elements, namely a cavity switching element 44 in the active or passive mode and a nonlinear material 46 making it possible to multiply by a factor n ($n \geq 2$) the basic frequency of the active laser medium 38.

The different switching modes will be described in greater detail hereinafter. The nonlinear material can e.g. be a nonlinear KTP crystal, which makes it possible to double the basic frequency of the microlaser. For example, a radiation at 1064 nm obtained from a YAG:Nd active laser medium is converted by said crystal into radiation at 532 nm. A frequency quadrupling effect can be obtained by incorporating within the same microlaser cavity a nonlinear KTP crystal and a nonlinear BBO crystal. The invention is also applicable to any nonlinear crystal type making it possible to double the frequency of the active laser medium of the microcavit, as well as any nonlinear crystal type permitting the multiplication of the frequency of the laser medium of the microcavity by a factor n ($n \geq 2$, e.g. n=3, 4, etc.). For example it is possible to use BBO, LBO, $KNbO_3$ and $LiNbO_3$.

The simultaneous presence within the microlaser cavity of means 44 for switching the same and means 46 for multiplying the basic frequency of the active laser medium has the consequence of very significantly increasing the operating efficiency of the frequency multiplying means. Thus, for a doubler crystal, an 80% efficiency has been established with said structure.

As illustrated in FIG. 5, other additional elements can be included in the cavity, such as an adhesive layer 4 making it possible to connect the saturable absorber 44 to the active laser medium 38 or a coating 50 of a medium making it possible to adapt the index at the interface of the media 46 and 44.

It is thus possible to produce a plane-plane cavity in which the input mirror 40 and output mirror 42 are planar. According to another embodiment, it is possible to obtain a stable cavity with concave micromirrors at the input and/or output of the microlaser cavity. The presence of at least one concave mirror makes it possible to stabilize the cavity, which then has a lower switching threshold and a better efficiency. Moreover, the presence of a concave micromirror makes it possible to adjust the size of the laser beam in the different cavity media, which further increases the power density with respect to the saturable absorber 44 and multiplier crystal 46. A micro-morror can be directly produced on the active laser material, as will be explained hereinafter. It is optionally possible to manufacture a microlens array of a transparent material, e.g. silica, on the surface of the laser material 38 or the element located last in the cavity, e.g. the multiplier crystal 46. The typical microlens dimensions are diameter 100 to a few hundred microns and radius of curvature a few hundred micrometers to a few millimetres.

A microlens production process is described in the article by A. EDA et al, CLEO'92, paper CWG33, p 282 (Conf. on Laser and Electro-optics, Anaheim, USA, May 1992).

According to an embodiment, the microlaser cavity is passively switched. In this case the switching element 44 (of FIG. 5) is a saturable absorber element.

Figure 6A:
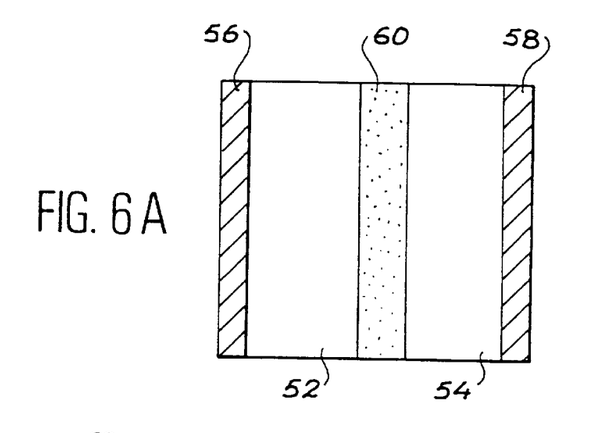
FIGS. 6A & 6B Two embodiments of the invention with a switching device in the form of a saturable absorber film.
Figure 6B:
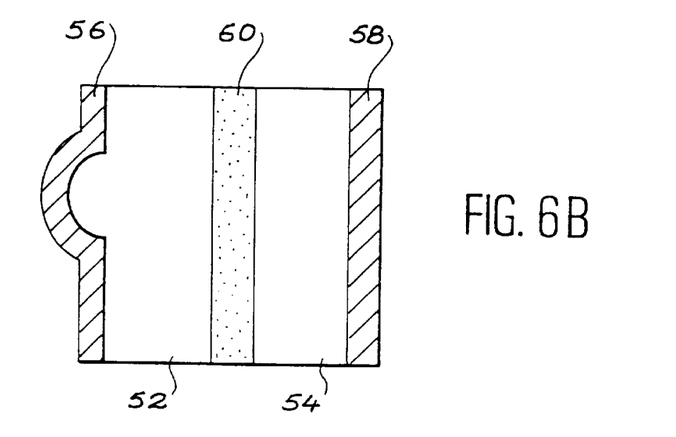

According to a particularly advantageous embodiment, the saturable absorber is in thin film form. It is particularly advantageous to deposit the saturable absorber film directly on the laser amplifier medium, as illustrated in FIGS. 6A and 6B. In the latter, reference 52 designates the active laser medium of the microlaser cavity, reference 54 designates the optically non-linear medium making it possible to multiply the basic frequency, e.g. a frequency doubler, 56 and 58 designate the input and output mirrors of the microlaser cavity and 60 a saturable absorber in the form of a film deposited directly on the active medium 52.

Use can be made of two types of thin film. A polymer containing saturable absorber molecules. Typically for a microlaser at 1.06 $\mu$m, it is possible to use as the saturable absorber an organic dye such as bis(4-diethylaminodithiobenzyl) nickel (BDN, Kodak, CAS No. 51449-18-4) in a solution containing by weight 6% polymethyl methacrylate (PMMA) in chlorobenzene. Variants are described hereinafter in conjunction with the preparation process. This type of solution is deposited with a trammel directly on the laser material (cf. hereinafter for the preparation process). This leads to films with a thickness of approximately 1 to 5 $\mu$m, e.g. 2, 3 or 4 $\mu$m.

Another thin film type is obtained by liquid phase epitaxy (LPE), directly on the laser material or any other process permitting the production of the same deposit (same material, same doping, same properties). Thus, the film can generally be obtained by LPE. The LPE preparation process is described hereinafter and makes it possible to obtain on the substrate 52 constituted by the active solid medium a film thickness between 1 and 500 $\mu$m (e.g. 100, 200, 300 or 400 $\mu$m). It is constituted by a basic material identical to the basic material of the active solid medium (e.g. YAG), but it is doped with ions giving it saturable absorber properties, e.g. $Cr^{4+}$ for a laser at 1.06 $\mu$m or $ER^{3+}$ for a laser at around 1.5 $\mu$m.

Thus, the dopant type is adapted to the laser which it is wished to switch, so that the epitaxied layer has a saturable absorption at the emission wave-length of said laser.

Therefore, in this case, the active laser material and the saturable absorber film have the same crystalline structure and only differ by the different dopings which affect the crystalline and optical properties of these two media. The properties of the film are very different in the two cases.

Thus, the damage threshold is defined for each film type. Beyond a certain power density present in the laser cavity, it is possible to destroy the saturable absorber film. This limit power density known as the damage threshold will be lower in the case of the polymer with organic dye than in the case of the LPE deposited film. Thus, in the first case it is necessary to work with lower energies deposited in the cavity than in the second case.

Moreover, in one case, the index difference between the laser material 52 and the polymer 60 introduces an optical interface between the two media. In the other case LPE can only be carried out on the same material (e.g. YAG on YAG, only the doping differing), which limits the extent of the applications, but makes it possible to adjust the index of the epitaxied film to that of the active laser medium, which serves as the epitaxy substrate and therefore avoid the formation of an optical interface between the two media.

Finally, the nature of the film will influence the time form of the laser pulse. In the case of the organic dye dissolved in a polymer, the dye decline time is very short (~1 ns), whereas in the case of the epitaxied film the ions constituting the impurities ($Cr^{4+}$, $Er^{3+}$) have much longer decline times of approximately 1 microsecond. These properties will clearly condition the choice of the film as a function of the intended use.

The structure described hereinbefore (saturable absorber in the form of a film directly deposited on the active laser medium) makes it possible to obtain a compact microlaser cavity requiring no alignment, requiring the introduction of no parasitic element such as optical adhesive and also avoiding use of the codoping of a same basic material for forming, from said same basic medium, the active laser medium and the passive switching device.

A process for the production of a microlaser according to the invention in passively switched form will now be described. The following stages can be distinguished therein:

1) The active laser material is chosen and conditioned, being oriented and cut into plates of thickness between 0.5 and 5 mm. The plates are then ground and polished, so that the final desired thickness e can be obtained.

2) A saturable absorber preparation stage.

2a) In the case of a conventional saturable absorber, various processes are known making it possible to obtain a switched microlaser cavity. It is in particular possible to carry out a codoping of the basic material of the active laser medium to give it properties of the active laser medium and saturable absorber (e.g. YAG doped with neodymium $Nd^{3+}$ and chromium $Cr^{4+}$ ions).

2b) In the case of a saturable absorber deposited in film form, two deposit types can be effected.

2b1) First deposit type: deposit of a saturable absorber organic dye dissolved in a polymer.

Typically, for a microlaser operating at 1.06 $\mu$m, it is possible to use as the saturable absorber an organic dye bis(4-diethylaminodithiobenzyl)nickel (BDN, Kodak, CAS No. 51449-18-4) in a polymethyl methacrylate (PMMA) solution.

For this purpose, preparation takes place of a solution containing 6 wt.% polymethyl methacrylate (Polyscience average weights) in chlorobenzene (Prolabo) stirring for 24 hours. To it is added 0.2 wt.% BDN, followed by stirring for 2 hours. The solution is then filtered and deposited on the substrate on the output or exit face (opposite to the input or entrance face having the dichroic mirror) in dropwise manner with a circular centrifugal movement. For this trammel deposition use can be made of a standard machine such as that used in microelectronics for the deposition of resins used in lithograph operations. The substrate is previously cleaned with respect to all traces of impurities resulting from the polishing operation. It is rotated (trammel) for 20 seconds at 2000 r.p.m. and then for 30 seconds at 5000 r.p.m. The film is then dried for 2 hours in an oven at 70° C.

This gives a 1 um thick film containing 3% active molecules (BDN) and whose optical density is 0.13 at 1.06 $\mu$m (74% transmission) before saturation. Such a saturable absorber has a relaxation time close to 10 ns and is saturated at an intensity close to 1 MW/cm$^2$.

By varying the concentration parameters of the polymer, its molecular weight or its solvent, the dye proportion and the rotation speed of the trammel, it is possible to adjust the saturable absorber performance characteristics.

The typical specifications obtained are:

film thickness: 1 to 5 $\mu$m (e.g. 2, 3 or 4 $\mu$m), density of molecules: 5 to 10 wt.%, dye: BDN, mm=685 g, glass transition point: Tg=78° C., absorption at 1.06 $\mu$m: 10 to 70%, saturation level: 90%, effective cross-section: 10$^{-16}$ cm$^2$, relaxation time: 2 to 15 ns, saturation intensity: 0.1 to 1 MW/cm$^2$, film non-uniformity: <5% on 1 cm$^2$, depolarization rate: <10$^{-5}$, losses at 800 nm: <1%, repetition frequency: 10 to 10,000 Hz, photostability: 10$^8$ strokes, deposition method: trammel.

Other polymers such as polyvinyl alcohol, polyvinyl acetate or polystyrene can be used in their respective solvents in place of PMMA. It is also possible to use as the dye bis(4-dimethylaminodithiobenzyl)nickel (BDN, Kodak, CAS No. 38465-55-3).

The dye can also be incorporated into a silica gel or grafted on the polymer chain.

Numerous other dithiene metal complexes can be used as the dye for other wavelengths, as described in the articles by K. H. Drexhage et al, Optics Communication 10(1), 19, 1974 and Mueller-Westerhoff, Mol. Cryst. Liq. Cryst. 183, 291, 1990.

The method can also be used for switching lasers operating at wavelengths other than 1.06 $\mu$m. For example, switching takes place of Er or Er+Yb lasers (Er or Er+Yb doped materials where the active ion is Er) emitting at around 1.5 $\mu$m with tetraethyloctahydrotetraazapentaphene-dithiolato-nickel (cf. the aforementioned Mueller-Westerhoff article).

2b2) Second deposit type: deposit of a film by liquid phase epitaxy (LPE).

The saturable absorber (S.A.) film is obtained by soaking the substrate, on which it is deposited, in a suitably chosen supersaturated solution. This solution or epitaxy bath is a mixture of a solvent and a solute constituted by different elements forming the final material. The substrate and film have the same crystalline structure and only differ by the different dopants affecting the crystalline and optical properties of the film. The active ions such as Nd, Er and Yb make the material amplifying, other ions (Cr, Er) give it S.A. properties and certain others can be used for varying the refractive index or crystal lattice of the material (e.g. Ga, Ge, Lu, etc.). It is thus possible to control the properties of the films produced.

This process can be applied to any existing material in monocrystal form (for producing substrates) and preparable by liquid phase epitaxy. This is the case for the materials referred to hereinbefore for the basic material of the active laser medium: $Y_3Al_5O_{12}$ (YAG), $Y_2SiO_5$ (YSO), $YVO_4$, $YLiF_4$ (YLF) or $GdVO_4$. The bath composition (choice of solvent and substituents), the concentrations in the solute of different oxides and the experimental growth conditions (temperature range, operating procedure, etc.) are adjusted for each material in order to obtain films having the best possible crystalline quality.

In the case of garnets (YAG), the solvent chosen is a $PbO/B_2O_3$ mixture and the solute comprises an $Al_2O_3$ excess in order to stabilize the garnet phase. The solute/solvent ratio is then calculated so as to obtain a growth at 1000° C.

As a function of the composition of the bath, the temperature and the deposition time, it is possible to adjust the thickness (1<e <200 $\mu$m, e.g.: 25 $\mu$m, 50 $\mu$m, 75 $\mu$m, 100 $\mu$m, 125 $\mu$m, 150 $\mu$m, 175 $\mu$m, it is also possible to obtain e>200 $\mu$m) and the dopant concentration in the films. A film is grown at constant temperature, which makes it possible to obtain a homogeneous dopant concentration throughout the film thickness. The substrate is given a uniform or alternating rotary movement, which leads to a good thickness uniformity.

It is possible to produce a substrate carrying one or two S.A. films as a function of whether one face of the active laser material is soaked in the bath, on the surface thereof, or this happens to both faces, the laser material being completely immersed in the bath.

The epitaxied face or faces obtained can be polished in order to remove roughness which may have been caused by the epitaxy process and bring the thickness of the epitaxied film or films to the desired thickness for the operation of the microlaser.

3) A stage of depositing or assembling the nonlinear material permitting the multiplication of the basic frequency of the laser material by a factor n (n$\geq$2), e.g. a nonlinear KTP crystal. The crystal is oriented according to the phase matching angle, which permits a multiplication of the laser frequency.

4) A stage of depositing input and output mirrors. These can be dichroic mirrors obtained by a deposition of dielectric multilayers, which is a known and commercially available process.

5) A stage of cutting plates to obtain microlaser chips.

The small plates having the mirrors, saturable absorber and active laser medium, as well as optionally microlenses are cut using a diamond saw (of the type used in microelectronics for cutting Si chips), in order to obtain laser chips with a cross-section of a few mm$^2$.

Figure 7:
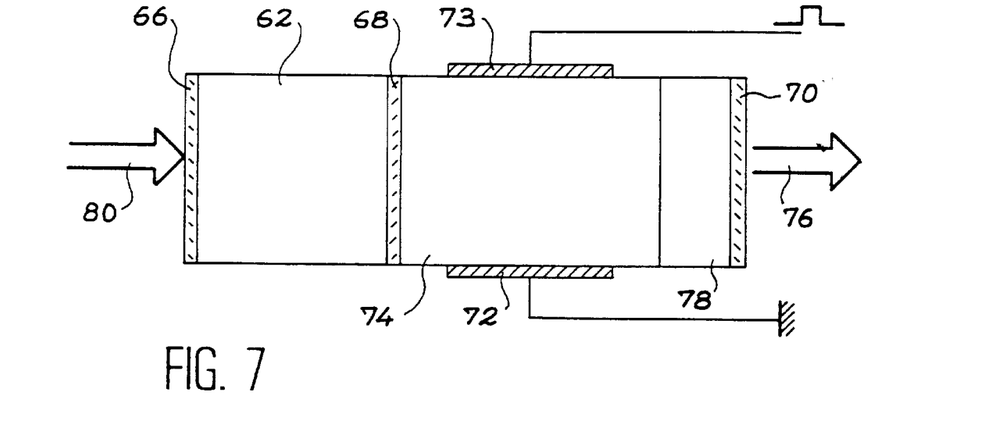
FIGS. 7 to 9 Microlaser embodiments according to the invention with an active switching device in a double Fabry-Perot cavity.

According to another embodiment of the invention, the microlaser cavity and microlaser are actively switched. An example of such a structure is illustrated in FIG. 7, where reference 62 designates the active laser medium forming a first resonant cavity between an input mirror 66 and an intermediate mirror 68. A second resonant cavity is formed between the intermediate mirror 68 and the output mirror 70. The second resonant cavity has an element 74, whose optical index can be modulated by an external disturbance. In particular, this material can be an electrooptical material, e.g. constituted by $LiTaO_3$. An external control voltage can be applied to electrodes 72, 73 and the application of said voltage leads to the establishment of an electric field in the material 74 and to a modification of the index of said material. This modification affects the coupling of the two cavities and modifies the reflectivity of the intermediate mirror 68 seen by the active laser medium. According to the invention, an optically nonlinear material 78 making it possible to multiply the basic frequency of the active laser medium by a factor n (n$\geq$2) is incorporated, e.g. into the second Fabry-Perot cavity, with the material 74, whose optical index can be modulated by an external disturbance. In this case, an antireflection treatment can take place between materials 74 and 78 so as not to disturb the operation of the second resonant cavity. Alternatively, the material 78 can be incorporated into the first Fabry-Perot cavity with the active laser medium 62. In this case an antireflection treatment can take place between materials 62 and 78. Here gain, the combination of the active switching device and the material making it possible to multiply the frequency by a factor n leads to an extremely significant increase in the operating efficiency of the latter, which can reach close to 80%.

Figure 8:
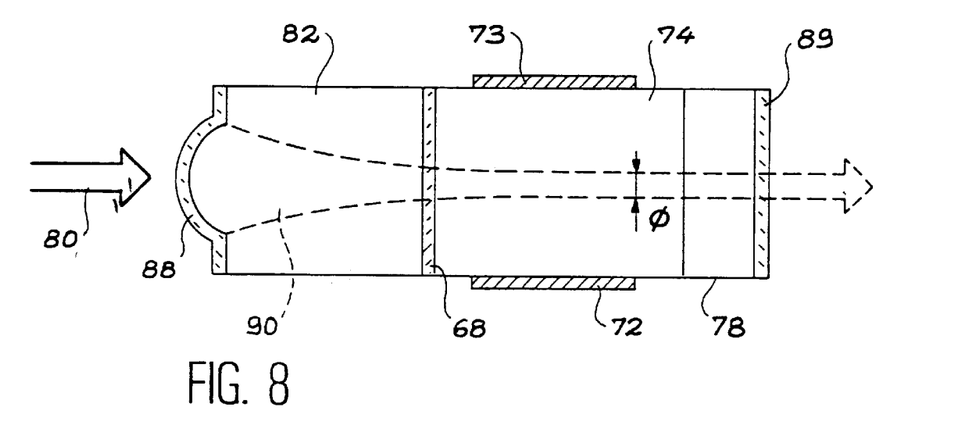
Figure 9:
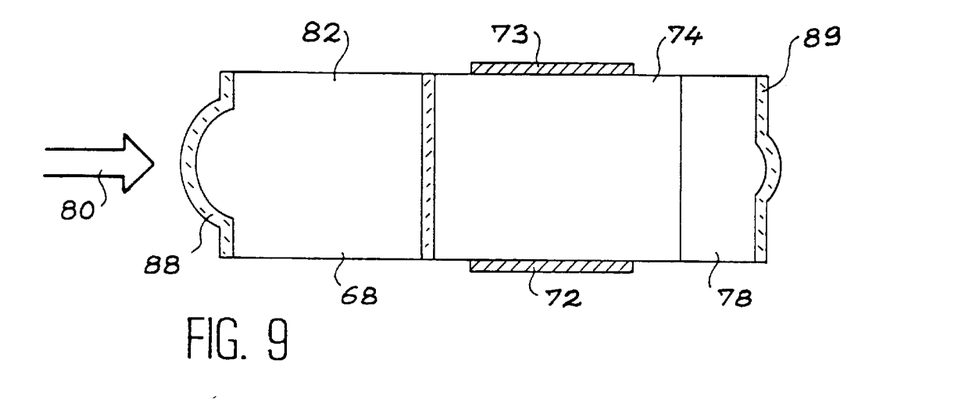

This embodiment can be further improved by adding laser beam size reduction means, which are located at the input of the first resonant cavity, the assembly of the two cavities and the laser beam reduction means being monolithic. This improvement is shown in FIGS. 8 and 9, where identical or corresponding elements to those of FIG. 7 are given the same references. Laser beam size reduction means 90 are indicated on each of these drawings by the reference 88. In the drawings, these means are formed by a micromirror 88 formed on the face of the active laser material 82 to be first traversed by the pumping beam 80.

With this structure it is possible to bring the global thickness of the microlaser and in particular the thickness of the material 74 to approximately 100 µm. In the case of an electrooptical material 74, this makes it possible to limit the voltage necessary for application between the electrodes 72, 73 to a value between 50 and 100 V. However, in the embodiment of FIG. 7 where all the mirrors are planar, high voltages must be applied between the electrodes 72, 73 to have an adequate index variation for switching the cavity. Thus, as explained hereinbefore in conjunction with the presentation of the prior art described in the article by J. J. Zayhowski, these high voltages can reach several hundred volts, namely 1000 V (cf. FIG. 4). Moreover, the embodiment according to FIGS. 8 and 9, i.e. with laser beam size reduction means located at the input of the first cavity, makes it possible to reduce the microlaser switching threshold to a few milliwatts.

Preferably, the radius of curvature of the micromirror 88 exceeds the total length of the microlaser (length $L_1$ of the active medium 82+length $L_2$ of the medium 74+length $L_3$ of the medium 78). Typically the radius of curvature will exceed approximately 1.5 to 2 mm. With this condition, an optically stable cavity is obtained and a diameter Φ of the laser beam 90 within the medium 74 of relatively small size, typically a few dozen micrometers (as opposed to approximately 120 µm in the prior art and in the embodiment of FIG. 7).

As illustrated in FIG. 9, it is also possible to obtain a structure in which a concave micromirror 89 is provided at the output of the second cavity. Moreover, the radii $R_1$ and $R_2$ of each of the two micromirrors 88, 89 can be chosen so as to obtain two optically stable cavities. This condition is in fact fulfilled for: $R_1$ $L_1$ and $R_2$ $L_2+L_3$. For the case where the medium 78 will be incorporated in the first cavity, this condition is written: $R_1$ $L_1+L_3$ and $R_2$ $L_2$. The case of the planoconcave cavity of FIG. 8 corresponds to R2=α.

It is also possible to use as the variable index medium $n_2$ an electrooptical element 74:
 either a magnetooptical material whose index $n_2$ is modified in response to an external magnetic field, e.g. with the aid of an electromagnet in the vicinity of said material,
 or a material whose index is a function of temperature or pressure variations imposed from the outside.

Another actively switched laser microcavity structure will now be described and this can be used in combination with the present invention, i.e. combined with an intracavity material making it possible to multiply the basic frequency of the microlaser cavity by a factor n (n≧2, e.g. a frequency doubler or tripler crystal).

Compared with the aforementioned structure (double Fabry-Perot cavity, FIGS. 7 to 9) and the structure described in the article by J. J. Zayhowski referred to hereinbefore, the laser microcavity structure obtained is much simpler and solves the problem of the complexity of known microlaser structures operating in the active mode. In addition, the structure obtained, like the embodiment described in conjunction with FIGS. 7 to 9, makes it possible to reduce the control voltage to be used when an electrooptical material is employed.

According to this embodiment, the microlaser cavity incorporates an active laser material and two micromirrors forming a Fabry-Perot cavity, said cavity being at the optical stability limit, and means are provided for varying the optical length of the microlaser cavity so as to pass it from an optically Thus, a new active switching is implemented, because the optically unstable state is a high cavity loss state as opposed to the optically stable state. This structure is radically different from the known structures and in particular that described by J. J. Zayhowski et al (cf. hereinbefore, because there is only a single Fabry-Perot cavity.

Figure 10:
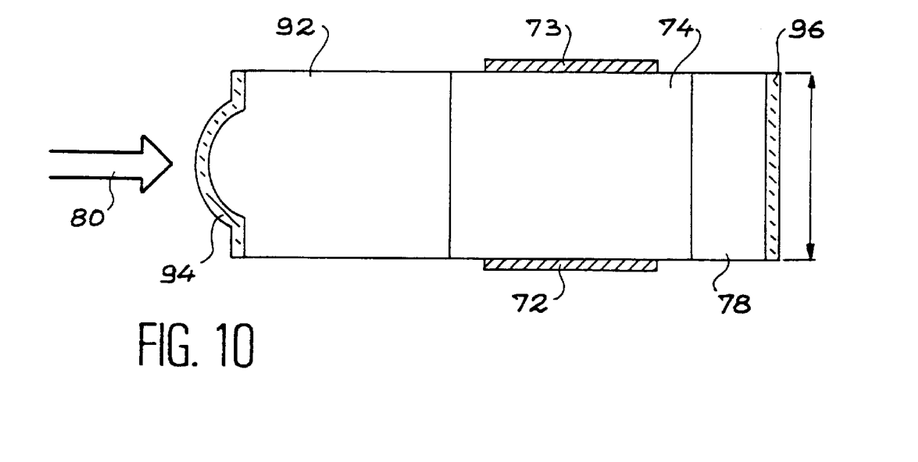
FIGS. 10 & 11 Two embodiments of a microlaser according to the invention, switched in the active mode and with a single Fabry-Perot cavity.
Figure 11:
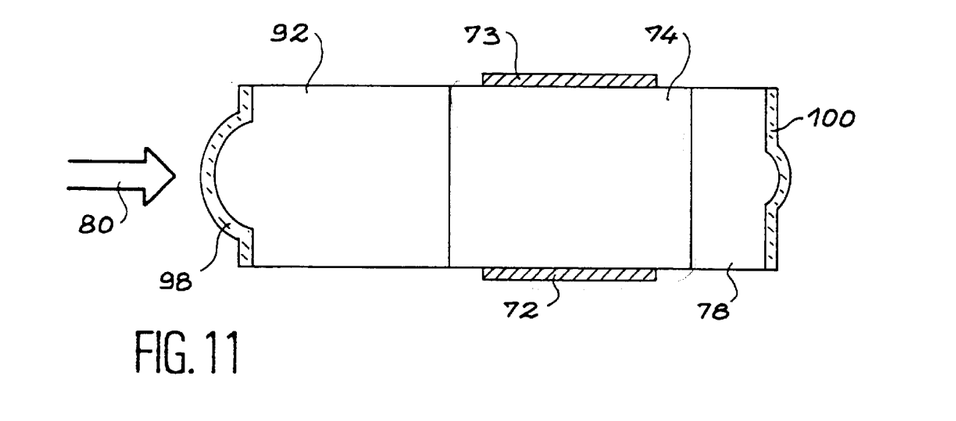

This embodiment is illustrated in FIGS. 10 and 11, where references 72, 73, 74, 78, 80 designate elements identical to those of FIGS. 7 to 9 given the same references. Reference 92 designates the active laser medium, 94, 98 an input mirror of the laser microcavity and 96, 100 an output mirror of the laser microcavity. The media 92 and 74 can be in contact with one another, an antireflection coating being depositable at the interface 92-74 and the interface 74-78. The microlaser cavity shown in FIG. 10 is a stability limit, hemispherical cavity. There is a single cavity made with one laser material, another material whose optical index can be varied by an external control voltage, and a material making it possible to multiply the frequency. Unlike in the two coupled cavities according to the prior art, these materials form a single Fabry-Perot cavity. The two materials 92 and 74 can be contacted by bonding or molecular adhesion. At the junction of these two materials there can be a low reflectivity of a few per cent due to the different optical indexes of the two materials, but this low reflectivity does not make it possible to obtain an adequate resonance in order to couple the two cavities in resonance, as in the systems described in the prior art.

The embodiment of FIG. It differs from that of FIG. 10 in that the output mirror 100 is a concave mirror with a radius of curvature $R_2$.

It is necessary to determine the characteristics of the mirrors in such a way as to produce an e.g. confocal cavity (with two concave mirrors as in FIG. 5) or hemispherical cavity (planoconcave, as in FIG. 4) at the stability limit.

In the case of the hemispherical cavity, the stability will be obtained for:

$$R_1 \geq L + \left(\frac{n_1}{n_2} - 1\right)L_2 + \left(\frac{n_1}{n_3} - 1\right)L_3,$$

with $L=L_1+L_2+L_3$.

In the case of the confocal cavity, the stability is obtained for:

$$R_1 \geq L + \left(\frac{n_1}{n_2} - 1\right)L_2 + \left(\frac{n_1}{n_3} - 1\right)L_3$$

$$R_2 \geq L + \left(\frac{n_3}{n_2} - 1\right)L_2 + \left(\frac{n_3}{n_1} - 1\right)L_1$$

Finally, for the concentric or spherical cavity, the condition relative to the stability is:

$$R_1 \geq L_1 + \frac{L_2}{2} \frac{n_1}{n_2}$$

$$R_2 \leq L_3 + \frac{L_2}{2} \frac{n_3}{n_2}$$

In each case, it is possible to vary either the index $n_2$, or the index $n_1$, or the index $n_3$, or one of the lengths $L_1$ or $L_2$ or $L_3$ so as to satisfy the corresponding inequation in order to bring the cavity into a stable state. The variation of one of these parameters is obtained by external control means. As the optically stable state of the cavity corresponds to a low loss state and the optically unstable state to a high loss state, a novel means is provided for actively switching a cavity.

In the case of the embodiments illustrated in FIGS. 10 and 11, the index $n_2$ of the electrooptical medium is modulated by applying an electric field.

Alternatively, in order to modify the optical length of the cavity, it is possible to replace the electrooptical material 74 by:
- a magnetooptic material whose index is modified in response to an external magnetic field, e.g. with the aid of an electromagnet in the vicinity of said material,
- a material whose index $n_2$ is dependent on the pressure, the index variation being obtained by a pressure variation.

It is also possible to modify the total geometrical length of the cavity by mounting the output mirror on piezoelectric means. This leads to controlled variation of the optical length of the microlaser cavity and permits the passage of the latter from an optically unstable state to an optically stable state.

The fact of using a hemispherical, confocal, concentric or spherical cavity makes it possible to concentrate the microlaser beam in the interior of the electrooptical material 74, when such a material is used. As the microlaser beam cross-section is reduced, it is possible to reduce the thickness of the material of index $n_2$. When use is made of an electrooptical material defining with the laser material a single cavity, it is thus possible to reduce the necessary distance between the contacting electrodes 72, 73 to obtain the field E necessary for the modulation of the index $n_2$. The voltage applied to the electrodes for obtaining the same field E is reduced by the same amount.

In FIGS. 10 and 11 the material 78 is shown on the output side of the micro-cavity. It can also be incorporated between the electrooptical material 74 and the active laser medium 92, the electrooptical material 4 then being at the microcavity output.

A process for the production of a microlaser according to the present invention, which is actively switched and has two coupled Fabry-Perot cavities, the second including an electrooptical material, will now be described, the process having the following stages:

1) In a first stage, the radii of curvature $R_1$ and $R_2$ are calculated if the stability of one or more cavities is desired.

2) In a second stage, there is a cutting and double face polishing of a laser material plate and a variable index second material plate, such as an electrooptical material (e.g. $LiTaO_3$).

Figure 12A:
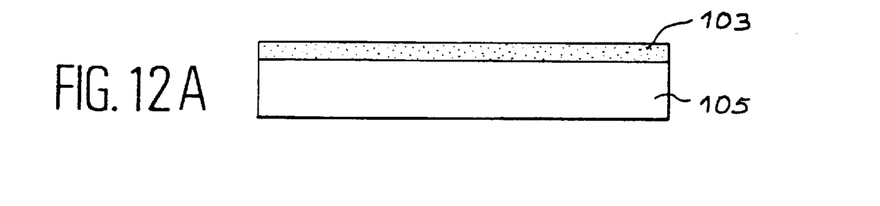
FIGS. 12A to 12E Stages in the formation of microlenses on an active solid laser medium for a microlaser according to the invention.
Figure 12B:
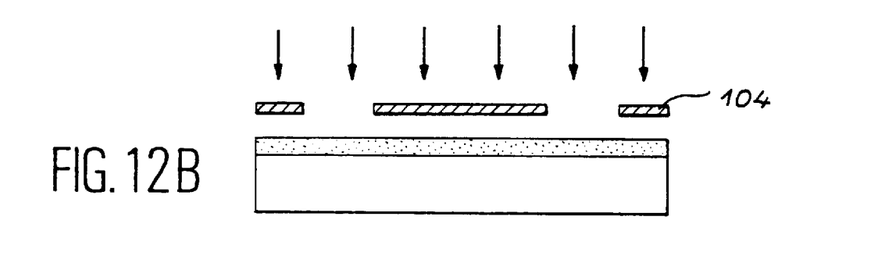
Figure 12C:
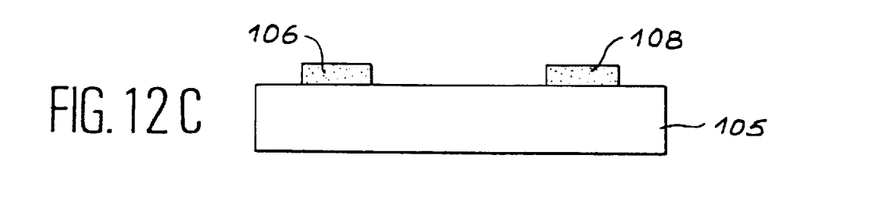
Figure 12D:
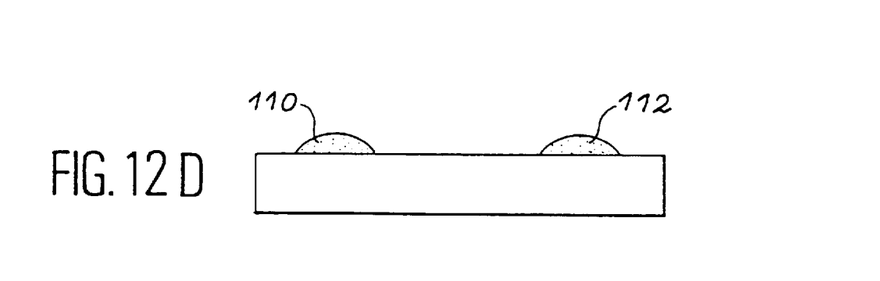
Figure 12E:
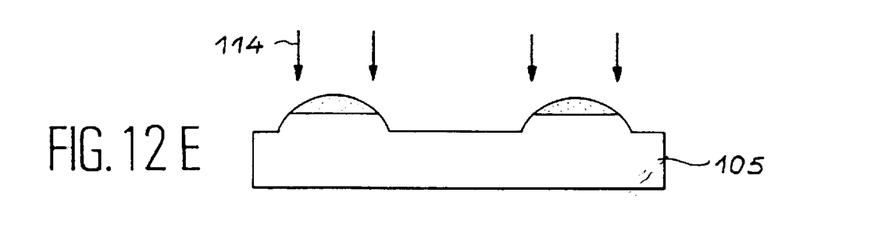

3) Then, by photolithography and machining, a micromirror is produced on the input face of the laser beam (typical diameter 100 to 500 µm and radius of curvature $R_1$ 1 to 2 mm). This stage is illustrated in FIGS. 12A to 12E. In a first substage (FIG. 12A), deposition takes place of a photosensitive resin coating 103 on the input face of the laser material 105. This is followed by the exposure of the resin through a mask 104 with the aid of UV radiation (FIG. 12B). The following stage (FIG. 12C) involves the chemical development of the resin, only leaving elements 106, 108 for forming the micromirrors. This is followed by a resin heat flow (FIG. 12D) for forming the resin micromirrors 110, 112 and the machining of the laser material 105 using an ion beam 114 (FIG. 12E).

Figure 13A:
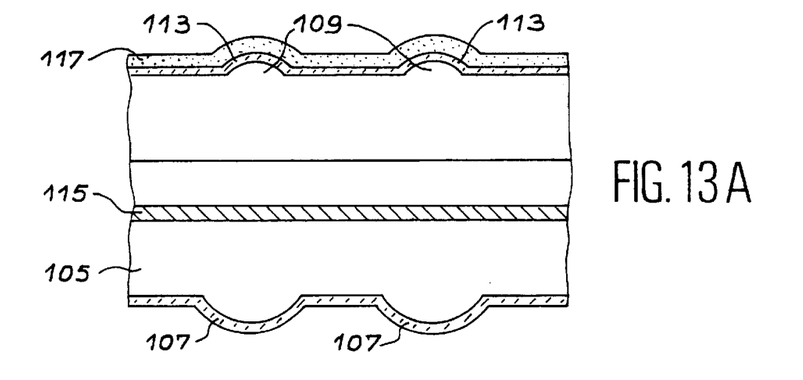
FIGS. 13A to 13C Other stages in the production of microlasers according to the invention.

Stages 4) to 9) are described in conjunction with FIG. 13A.

4) An input mirror 107 is deposited on the input face of the laser material 105.

5) A stage of depositing the nonlinear material permitting the multiplication of the basic frequency of the laser material by a factor n ($n \geq 2$), e.g. a nonlinear KTP crystal. The material is oriented in accordance with the phase matching angle adapted to the frequency multiplication.

6) Using photolithography and machining, microbosses 109 are produced on the output surface of the electrooptical material or, as a function of the particular case, the material making it possible to multiply the frequency (typical diameter 100 to 500 µm and radius of curvature $R_2$ 1 to 2 mm). In the case where the output mirror is a planar mirror, there is no microboss formation on the output face of the electrooptical material. Moreover, the diameter of the output mirror (microlens) can be less than the diameter of the input micromirror.

7) This is followed by the deposition of the output micromirror 113 on the output face of the electrooptical material or material making it possible to multiply the frequency.

8) In the eighth stage an intermediate mirror 115 can be deposited at the laser material-electrooptical material or laser material-frequency multiplier material interface.

9) The output face can be protected by a resin deposit 117.

10) It is possible to make grooves 109 (FIG. 13B) in the electrooptical material with the aid of a diamond saw used in microelectronics, so that subsequently electrodes with the desired spacing can be obtained.

Figure 13B:
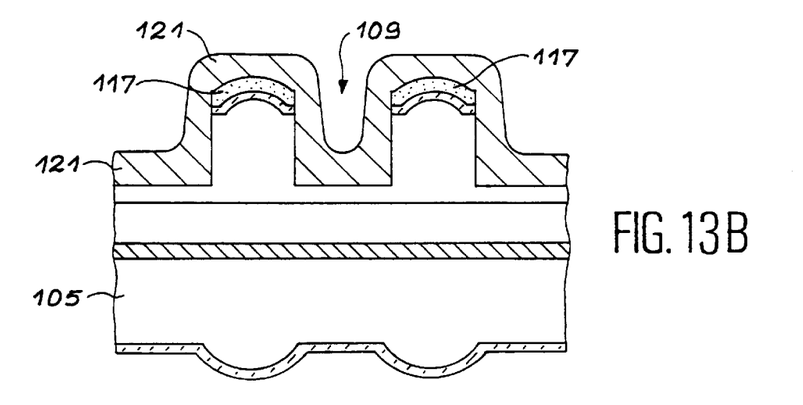

11) This is followed by the deposition of electric contacts by evaporation (e.g. deposition of a Cr-Au 121 coating which envelops the resin 116 and the electrooptical material).

Figure 13C:
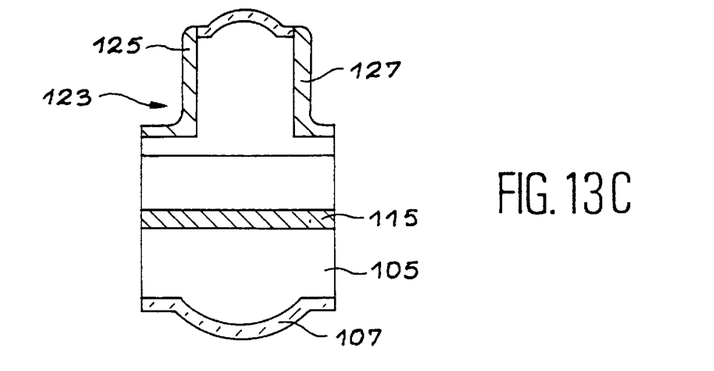

12) This is followed by the chemical etching of the protective resin (FIG. 13C).

FIGS. 13B and 13C show the case where it is the electrooptical material which is located on the output side of the laser microcavity. The expert will be able to adapt the order of the different stages for other configurations.

13) Elementary chips 123 with a size substantially equal to 1 $mm^2$ are then cut in the manner illustrated in FIG. 13C, where the references 125, 127 designate the electrooptical material control electrodes.

14) The chips are then mounted on a metallized printed circuit support which is impedance matched and with electrical contacting, followed by installation in a shielded box.

15) This can be followed by the installation in the box and the connection to a laser pumping diode and an electrical connector for switching.

A process for the production of an actively switched microlaser according to the invention having a single Fabry-Perot cavity will now be described, involving the following stages:

1) In a first stage a calculation takes place of the radii of curvature and lengths of the different media in the cavity, so as to be at the cavity stability limit.

2) to 6) See stages 2 to 6 of the process described hereinbefore.

7) In the seventh stage, an antireflection coating is deposited at the laser material-electrooptical material or laser material-frequency multiplier material interface. This coating could be deposited either on the planar output face of the laser material, or on the planar input face of the electro-optical or multiplier material, as applicable. Moreover, this deposit is not absolutely indispensable for the operation of the system.

8) The two plates are then bonded with the aid of an optical adhesive or assembly using any other process, e.g. molecular adhesion.

9) to 15) See stages 9 to 15 described hereinbefore.

Figure 14:
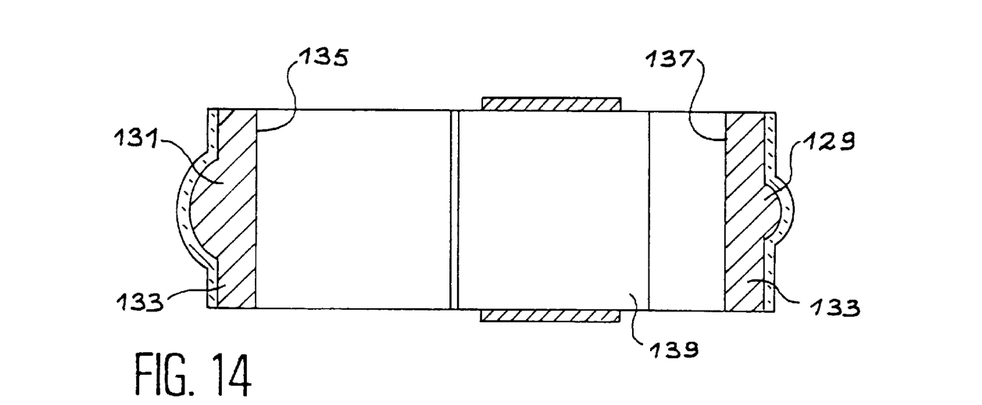
FIG. 14 A variant of the invention.

In the two active switching cases hereinbefore (double cavity and single cavity) and according to a variant, it is possible to manufacture the micromirrors with a variable density mask. Moreover and as illustrated in FIG. 14, micromirrors 129, 131 can be produced on a material 133 such as glass or silica, which is transparent to the laser wavelength. These substrates with micromirrors can then be attached to the input face 135 of the laser medium 136 and output face 137 of the doubler or tripler crystal 138 (or electro-optical material 139 if these elements are reversed). The structure obtained is illustrated in FIG. 14.

Moreover, all known types of laser materials (crystals or glasses) can be used. In particular, the basic wavelength will be determined as a function of the active ions, around 1 μm for Nd and Yb, 1.55 μm for Er and Er+Yb and 2 μm for Tm and Ho.

We claim:

1. A Microlaser cavity comprising:
   a first active solid material, cavity switching means, at least one element of an optically non-linear material, multiplying a basic frequency of the microlaser cavity by an integer n (n≧2), being incorporated in the interior of the cavity, wherein said cavity switching means is a passive switching means comprising a saturable absorber material film directly deposited on the solid active medium, and formed by an organic dye dissolved in a polymer solvent, said organic dye being chosen from among a group consisting of bis (4-diethylaminodithiobenzyl) nickel and bis(4-dimethylamino-dithiobenzyl) nickel and the solvent being a solution selected from among a group consisting of polymethyl methacrylate (PMMA), polyvinyl alcohol, and polyvinyl acetate of polystyrene.

2. A Microlaser cavity according to claim 1, wherein said cavity is a stable cavity.

3. A Microlaser cavity comprising:
   a first active solid material, cavity switching means, at least one element of an optically non-linear material, multiplying a basic frequency of the microlaser cavity by an integer n (n≧2), being incorporated in the interior of the cavity, wherein said cavity switching means is a passive switching means comprising a saturable absorber material film directly deposited on the solid active medium, said film being a liquid phase epitaxy film and being formed from a basic material identical to that of the solid active medium and doped with one of $Cr^{4+}$ and $Er^{3+}$ ions.

4. A Microlaser cavity according to claim 3, wherein said cavity is a stable cavity.

5. Microlaser cavity comprising:
   a first active solid material, cavity switching means;
   at least one element of a second optically non-linear material, multiplying a basic frequency of the microlaser cavity by an integer n (n≧2), being incorporated in the interior of the cavity, said first active solid material forming a first resonant cavity between an input mirror and an intermediate mirror;
   a third material forming a second resonant cavity between the intermediate mirror and an output mirror, an optical index of said third material being modulated by one of an electric field, a magnetic field, and a pressure variation; and
   laser beam size reduction means being located at an input of the first resonant cavity, the assembly of the two cavities and the laser beam reduction means being monolithic and wherein said cavity is actively switched.

6. A Microlaser cavity according to claim 5, wherein said cavity is a stable cavity.

7. A Mictolaser cavity according to claim 5, wherein the reduction means includes a concave mirror produced with a micromirror on the face of the active laser medium to be traversed by the pumping beam.

8. A Microlaser cavity according to claim 5, wherein the output mirror is a concave mirror produced with a micromirror on the output face of the second material.

9. Mircolaser cavity comprising:
   a first active solid material, cavity switching means, at least one element of an optically non-linear material, multiplying a basic frequency of the microlaser cavity by an integer n (n≧2), being incorporated in the interior of the cavity, said first active solid material, the optically non-linear material element and two mirrors forming a Fabry-Perot cavity having an optical length, said cavity being at an optical stability limit, and means provided for varying said optical length of the cavity sp as to pass it from an optically unstable state corresponding to a high loss state, to an optically stable corresponding to a low loss state wherein said cavity is actively switched.

10. A Microlaser cavity according to claim 9, wherein said cavity is a stable cavity.

11. A Microlaser cavity according to claim 9, wherein the cavity is one of a hemispherical, a confocal, concentric and a spherical cavity.

12. A Microlaser cavity according to claim 9, wherein the cavity comprises a third material having a variable optical length.

13. A Microlaser cavity according to claim 12, wherein the means for varying the optical length of the cavity includes means for varying the length of the third material.

14. A Microlaser cavity according to claim 12, wherein the material constituting the active laser medium and the third material have a different optical index and the means for varying the optical length of the cavity includes means for varying the optical index of the second material.

15. A Microlaser cavity according to claim 12, wherein the third material is an electrooptical material.

16. A Microlaser comprising a microlaser cavity according to any one of claims 1, 3, 5, or 9 and means for pumping said cavity.

* * * * *